(12) United States Patent
Yudell et al.

(10) Patent No.: US 12,246,694 B2
(45) Date of Patent: Mar. 11, 2025

(54) ACTIVE TORQUE MANAGEMENT CLUTCH SYSTEM

(71) Applicant: TEAM Industries, Inc., Bagley, MN (US)

(72) Inventors: Alexander C. Yudell, Bemidji, MN (US); Carlos Romo Ramírez, Bemidji, MN (US); Jordan E. Fisk, Bemidji, MN (US)

(73) Assignee: TEAM Industries, Inc., Bagley, MN (US)

( * ) Notice: Subject to any disclaimer, the term of this patent is extended or adjusted under 35 U.S.C. 154(b) by 0 days.

(21) Appl. No.: 18/423,693

(22) Filed: Jan. 26, 2024

(65) Prior Publication Data

US 2024/0253610 A1    Aug. 1, 2024

Related U.S. Application Data

(60) Provisional application No. 63/481,707, filed on Jan. 26, 2023.

(51) Int. Cl.
| | |
|---|---|
| *B60W 10/02* | (2006.01) |
| *B60W 10/107* | (2012.01) |
| *B60W 30/18* | (2012.01) |

(52) U.S. Cl.
CPC .......... *B60W 10/02* (2013.01); *B60W 10/107* (2013.01); *B60W 30/18172* (2013.01); *B60W 30/1819* (2013.01); *B60W 2710/027* (2013.01)

(58) Field of Classification Search
CPC ............. B60W 10/02; B60W 30/1819; B60W 2710/027; B60W 10/023; B60W 10/107; B60W 30/18172; B60W 2030/203; B60W 2710/025; B60W 2710/021; B60W 2710/10; B60W 30/19; F16H 2037/023; F16H 9/12
USPC ............... 477/77, 44, 79, 80, 94, 39, 41, 70; 475/209
See application file for complete search history.

(56) References Cited

U.S. PATENT DOCUMENTS

| | | | | |
|---|---|---|---|---|
| 5,086,671 | A * | 2/1992 | Oshidari ............... | F16H 37/021 |
| | | | | 477/41 |
| 6,767,309 | B2 * | 7/2004 | Fujimoto ............ | F16H 61/0246 |
| | | | | 477/44 |
| 9,353,840 | B2 * | 5/2016 | Eo ......................... | F16H 37/021 |
| 2015/0087463 | A1 * | 3/2015 | Nakagawa ............ | F16H 37/022 |
| | | | | 475/201 |
| 2020/0400222 | A1 | 12/2020 | Yudell et al. | |

(Continued)

FOREIGN PATENT DOCUMENTS

| | | |
|---|---|---|
| EP | 0787927 A2 | 8/1997 |
| WO | 2020172428 A1 | 8/2020 |

*Primary Examiner* — Roger L Pang
(74) *Attorney, Agent, or Firm* — Fogg & Powers LLC

(57) ABSTRACT

An active torque management clutch system that includes an ATM clutch, a clutch actuator, and a controller is provided. The ATM clutch is positioned between a driven sheave of a CVT and an axle. The clutch actuator is used to control the ATM clutch. The controller is in communication with at least one vehicle sensor and the clutch actuator. The controller is configured to open the ATM clutch when sensor information indicates a shift is about to occur and close the ATM clutch when the sensor information indicates engine torque is required in a driveline.

19 Claims, 11 Drawing Sheets

(56) References Cited

U.S. PATENT DOCUMENTS

2023/0313872 A1* 10/2023 Burgett ................ F16H 37/021
                                                              477/39

* cited by examiner

ACTIVE TORQUE MANAGEMENT CLUTCH SYSTEM

CROSS-REFERENCE TO RELATED APPLICATIONS

This application claims priority to U.S. Provisional Application Ser. No. 63/481,707, same title herewith, filed on Jan. 26, 2023, which is incorporated in its entirety herein by reference.

BACKGROUND

Side-by-side vehicles, and similar vehicles are designed to handle extreme driving conditions that generate high transient torque events on the driveline. High transient torque loading events may occur for example during power on/off landing associated with jumps and going over rough terrain. High transient torque events result from large wheel-speed differential relative to ground speed due to application of throttle (power on) or brake (power off) and when the vehicle re-contacts the ground. Further, when the vehicle re-contacts the ground, the wheels and driveline experience a large torque spike as the inertia of the components is forced to accelerate rapidly to re-synchronize with ground speed. In addition, going over rough terrain may cause torque transient events by similar mechanism as the wheels briefly become airborne causing them to speed up or slow down while not engaged with the ground.

In vehicles that employ a continuously variable transmission (CVT), high transient torque loading events may cause a belt of the CVT to slip between sheaves of the CVT which are clamped to prevent slip at a finite torque level. A slip of the belt between the sheaves may cause damage to the sheaves and/or belt. As result, components may be overdesigned to function properly when high transient torque loading events occur. The slip of a steel belt in a steel belt CVT is especially prone to cause damage.

Further, transmissions that employ shift dogs can require an undesirable amount of force to complete a shift. This is because drag on the driveline results in friction between the shift dog and its receiving element. The friction results in it being more difficult to axially slide a shift dog to get it out of engagement with its receiving element. In some dog shift transmissions, a backwards facing angle is included between the dog tooth and the receiving dog pocket. This angle is employed to force the dog into positive engagement under a torque load. These back-angled dogs have an additional force requirement to execute a shift under drag torque loads, because the backwards angle must be defeated to disengage the dog.

For the reasons stated above and for other reasons stated below which will become apparent to those skilled in the art upon reading and understanding the present specification, there is a need in the art for a system that effectively and efficiently deals with high transient torque loading without requiring oversized-overdesigned products in the driveline while delivering acceptable shift quality results.

SUMMARY

The following summary is made by way of example and not by way of limitation. It is merely provided to aid the reader in understanding some of the aspects of the subject matter described. Embodiments provide an active torque management (ATM) clutch that is positioned between a continuously variable transmission and a driveline that is configured to be opened upon the determination that a shift is about to occur. Shifts may include shifts to and from park, reverse, neutral, drive, low etc.

In one embodiment, an active torque management clutch system that includes an ATM clutch, a clutch actuator, and a controller is provided. The ATM clutch is positioned between a driven sheave of a CVT and an axle. The clutch actuator is used to control the ATM clutch. The controller is in communication with at least one vehicle sensor and the clutch actuator. The controller is configured to open the ATM clutch when sensor information indicates a shift is about to occur and close the ATM clutch when the sensor information indicates engine torque is required in a driveline.

In another embodiment, a method of operating a vehicle with an active torque management clutch system is provided. The method includes generating sensor information with at least one sensor; determining if a shift is about to occur based on the sensor information; opening an active torque management (ATM) clutch that is positioned between a driven sheave of a continuously variable transmission (CVT) and a driveline when it is determined that the shift is about to occur; and closing the ATM clutch when is determined that engine torque is required by the driveline.

In still another embodiment a vehicle is provided. The vehicle includes a motor, a CVT, a launch clutch, a driveline, and ATM clutch, at least one sensor, and a controller. The motor provides engine torque. The CVT includes a drive sheave and a driven sheave. The motor is in operational communication with the drive sheave of the CVT. The launch clutch is positioned between the motor and the drive sheave of the CVT. The driveline includes a gearbox that is shifted with shift dogs. The ATM clutch is positioned between the gearbox of the driveline and the driven sheave. The clutch actuator is used to control the ATM clutch. The controller is in communication with the at least one vehicle sensor and the clutch actuator. The controller is configured to open the ATM clutch when sensor information indicates a shift is about to occur to prevent drag torque from the CVT from crossing over to shift dogs during a shift and close the ATM clutch when the sensor information indicates that engine torque is required in the driveline.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide an active torque management (ATM) clutch that is positioned between a secondary pulley (driven sheave) of a continuously variable transmission (CVT) and an axle (such as a half shaft of a vehicle). Embodiments actively maintain torque transmittable through the ATM clutch, at level higher than a motive torque (engine torque times a gear ratio from the engine to the ATM) but lower than a torque that could cause an endless looped member (such as a belt) to slip on an engagement face of the drive sheave of the CVT. The ATM clutch in embodiments is further controlled to relieve residual torque for reduced shift effort during a shift of a gear box. In some embodiments, an "open before a shift" process occurs where the ATM is opened before a driver shifts between park-reverse-neutral-drive-low (P-R-N-D-L) to minimize variator induced driveline drag on a dog-shifted transmission. Further in another example, the ATM clutch opens before a shift in a vehicle that shifts between first, second, third, etc. gears.

Figure 1A:
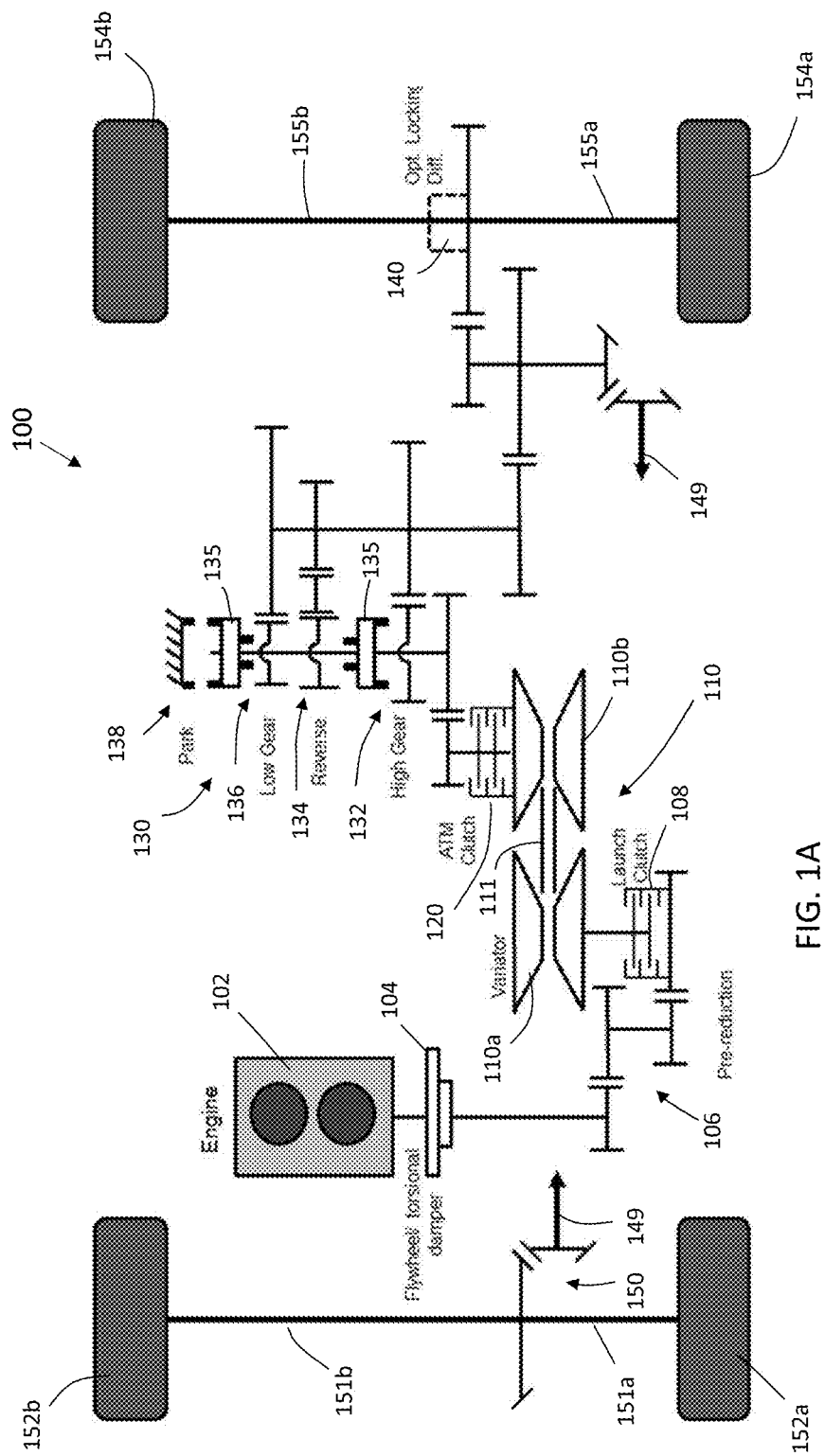
FIG. 1A illustrates a block diagram of a vehicle including an ATM clutch according to an example aspect of the present invention.

Referring to FIG. 1A, vehicle 100 that includes an ATM clutch of an example is illustrated. In this example, the vehicle includes an engine 102 that produces engine torque. The engine may be an internal combustion engine, an electric motor, or any other type of motor that generates engine torque. A flywheel/torsional damper 104 is in operational communication with engine 102. A reduction gear set 106 is positioned between a launch clutch 108 and the flywheel/torsional damper 104. In another example a reduction chain arrangement may be used. In another example, there may be no reduction between the engine and the launch clutch.

Vehicle 100 further has a CVT 110 that includes a drive sheave 110a and a driven sheave 110b that are in operational communication with each other by an endless looped member 111, such as a belt. The drive sheave 110a is in operational communication with the reduction gear set 106. The driven sheave 110b is an operational communication with the ATM clutch 120.

The ATM clutch 120 is in operational communication with the driveline that includes, in this example, a gearbox 130, a front differential 150, a rear differential 140, front wheels 152a and 152b and rear wheels 154a and 154b.

The gearbox 130 in this example, includes a high gear set 132, a reverse gear set 134, a low gear set 136, and a park gear 138 that are shifted using shift dogs 135. The gearbox 130, which is a transaxle in this example, is in operational communication with rear wheels 154a and 154b via half shafts 155a and 155b and front wheels 152a and 152b via prop shaft 149. Further, the prop shaft 149, in this example, is in operational communication with a front differential 150 which is in turn in operational communication with the front wheels 152a and 152b via front half shafts 151a and 151b. This example also illustrates an optionally lockable rear differential 140 that may be part of the transaxle. In another example the rear differential is replaced by a spool type final drive. In other examples where the gearbox 130 is not part of a transaxle, a rear prop shaft may be used to provide operational communication between the gearbox 130, which may generally be referred to as a transmission, and the rear wheels 154a and 154b. Further as discussed herein, an axle may be a rear axle formed at least in part by the half shafts 155a and 155b or a front axle formed at least in part by front half shafts 151a and 151b. The ATM clutch 120 is positioned between the driven sheave 110b of the CVT 110 and an axle (either the front or rear axle).

Figure 1B:
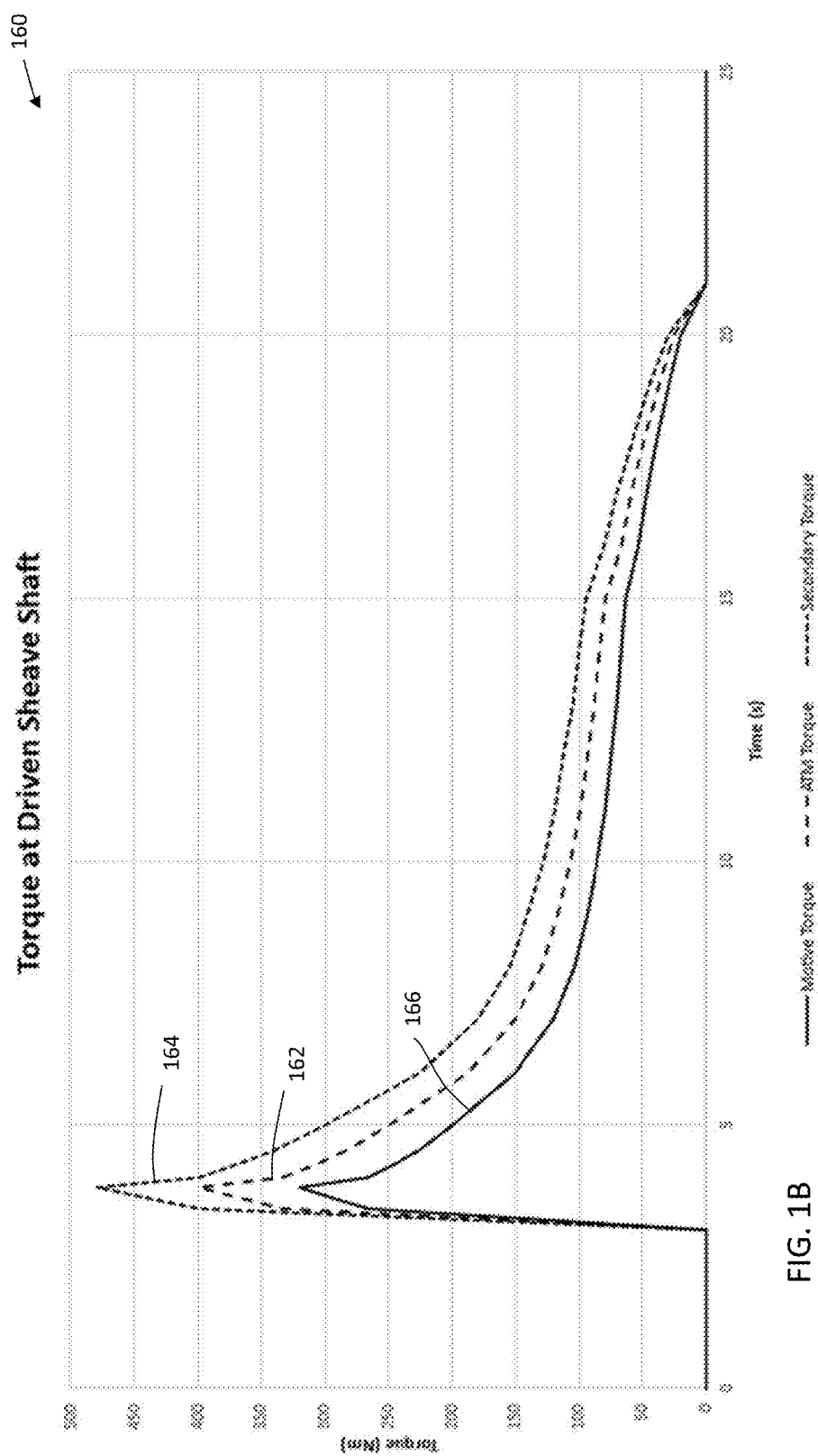
FIG. 1B illustrates a torque graph according to an example aspect of the present invention.
Figure 2:
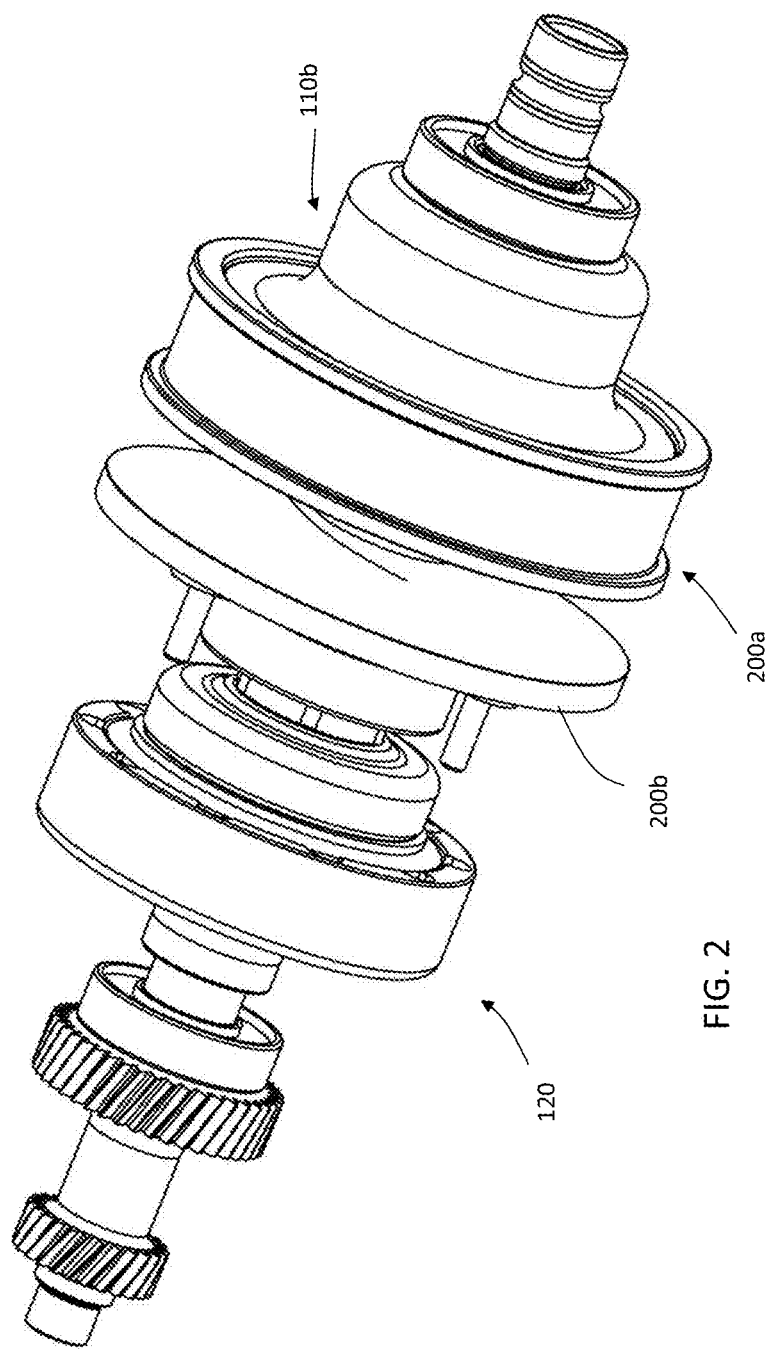
FIG. 2 is a side perspective view of a driven sheave and ATM clutch assembly according to an example aspect of the present invention.

The ATM clutch 120 is configured to act as a torque fuse between the wheels 152a, 152b, 154a and 154b and the CVT 110 (variator). In an example, an ATM slip torque level is controlled by modulating the hydraulic clamp pressure sent to a clutch pack discussed below. A controller (discussed below in regard to FIG. 9) monitors a CVT ratio and instantaneous engine torque production. With this information, the controller can calculate how much torque is being transmitted across the ATM clutch 120 at a given time. The ATM slip torque is dynamically maintained at above an engine torque times the gear ratio to the driven sheave 110b of the CVT 110 which may be referred to as a "motive torque." The motive torque is dynamic since it is tied to the gear ratio to the drive sheave, as well as instantaneous engine torque production. This arrangement allows the clutch pack of the ATM clutch 120 to transmit the engine produced torque, times the instantaneous gear ratio to the ATM. The ATM slip torque capacity is maintained below a torque that would cause the secondary (or driven) sheave 110b of the CVT 110 to slip on the endless looped member 111 (i.e., a belt in an example). This is illustrated in the torque capacity graph 160 of FIG. 1B. The torque capacity graph 160 provides a variator (driven sheave) output shaft torque versus time. Illustrated in torque capacity graph 160, the ATM clutch capacity 162 when closed is generally set to be less than a secondary torque capacity 164 of the system to prevent torque spikes from being transmitted to the CVT causing a belt to slip and greater than the motive torque 166 provided by the engine 102 to allow engine torque to be communicated through the driveline.

When a torque transient that is greater than the ATM torque capacity reaches the ATM clutch 120 from wheels 152a, 152b, 154a or 154b, slip occurs at the ATM clutch 120, not at the driven sheave 110b. Benefits for using the ATM clutch includes lower peak torque levels on re-synchronization events, and lower fatigue cycle loading which protects driveline components and may allow the driveline components to be sized smaller.

In steel belt CVT's without a disconnect between the wheels and the secondary (driven sheave), the driven sheave of the CVT necessarily rotates with the wheels. Rotating the CVT (variator) without hydraulic pressure (engine off) provides a large risk of belt slip and damage to the CVT. As a result, these types of vehicles without a disconnect, are typically required to be towed on a flatbed trailer. In off road power sports, a disabled vehicle in a remote area presents problems in retrieving the disabled vehicle if a flat-bed tow vehicle cannot reach the location of the disabled vehicle.

Another benefit with the use of ATM clutch 120 as described, is that the ATM clutch 120 may function as an automatic disconnect device. In this example, ATM clutch 120 is configured to be normally open in absence of hydraulic pressure which may occur when the engine is turned off, or if ATM pressure is set to zero, the CVT 110 becomes disconnected from the wheels 152a, 152b, 154a and 154b. This allows "flat towing" with all four wheels on the ground and mitigates the danger of spinning the driven sheave under zero or low clamp load conditions.

Still yet another benefit of ATM clutch 120 is that the ATM clutch 120 allows for a downshift following panic brake/wheel lockup. During aggressive driving, or driving on slippery surfaces, heavy brake application may result in wheel lockup. Without the disconnect provided by the ATM clutch 120, locked up wheels will also cease motion of the CVT 110. The CVT 110 requires rotation in order to shift up or down. Locked up wheels prevent shifts. This means that if there is a significant decrease in speed, the CVT 110 may be stuck in a higher gear ratio than optimal, resulting in a slow relaunch or even engine stall.

Automotive applications address this concern with an antilock brake system (ABS). ABS prevents the wheels from fully locking up, allowing the CVT to turn during emergency or panic stops, thereby allowing the CVT to shift. Most off-road applications, however, do not have ABS. In an embodiment, the controller discussed below identifies a wheel lockup event with sensor information and opens the ATM clutch 120 while the launch clutch 108 remains connected. This allows the CVT 110 to spin with engine 102. The CVT 110 can then downshift at a predetermined rate in anticipation of a lower vehicle speed following lockup event. In another example the downshift is influenced by vehicle sensors such as accelerometers, gyroscopes, or an inertial measurement unit (IMU).

Further, another benefit that can be achieved with an ATM clutch 120 is to relieve residual torque for shifting. In an example, a primary torque path may be provided by dog shifting between High-Low-Neutral in the gearbox 130. The shift dogs 135 must slide on splined shafts to shift in/out of gear. If there is torque being transmitted between the shaft spline and the shift dog 135, sliding friction, or torque required to defeat the back angle at the shift dog 135 increases. The increase in linear force requires an increased shift effort for manually shifted transmissions. A manual shift means that the shift dogs 135 are moved by a user actuated cable or linkage mechanism via a shift lever. Increased or inconsistent shift effort may not be acceptable to users. Further, a decrease in linear force required to shift also benefits shifting that is executed by an actuator. If the actuator requires less force, a smaller sized actuator using less power may be used.

A CVT that is hydraulically actuated maintains a minimum pressure in order to prevent the actuation pistons from evacuating, because some leakage is inevitable in many designs. Even with low pressure in the actuation pistons, CVT 110 generates significant drag torque making dog shifting difficult, since a back angle on the dog teeth require very slight movement of the CVT to disengage.

In embodiments, drag torque from the CVT 110 is removed by opening the ATM clutch 120. This prevents the drag torque from the CVT 110 from crossing over to the shift dogs 135. A controller, such as controller 902 discussed below, implements operating instructions to identify when a shift is imminent based on received sensor information. When it is determined that a shift is imminent, the ATM clutch 120 is opened. The sensor information may include at least one of vehicle speed, engine speed, produced engine torque, throttle pedal position, brake pedal position and variator (CVT) ratio. The opening of the ATM clutch 120 before a shift occurs, allows for a reduction in required motor or actuator size in both electrically and hydraulically dog shift transmissions, or reduced shift effort in manually shifted transmissions.

Figure 3:
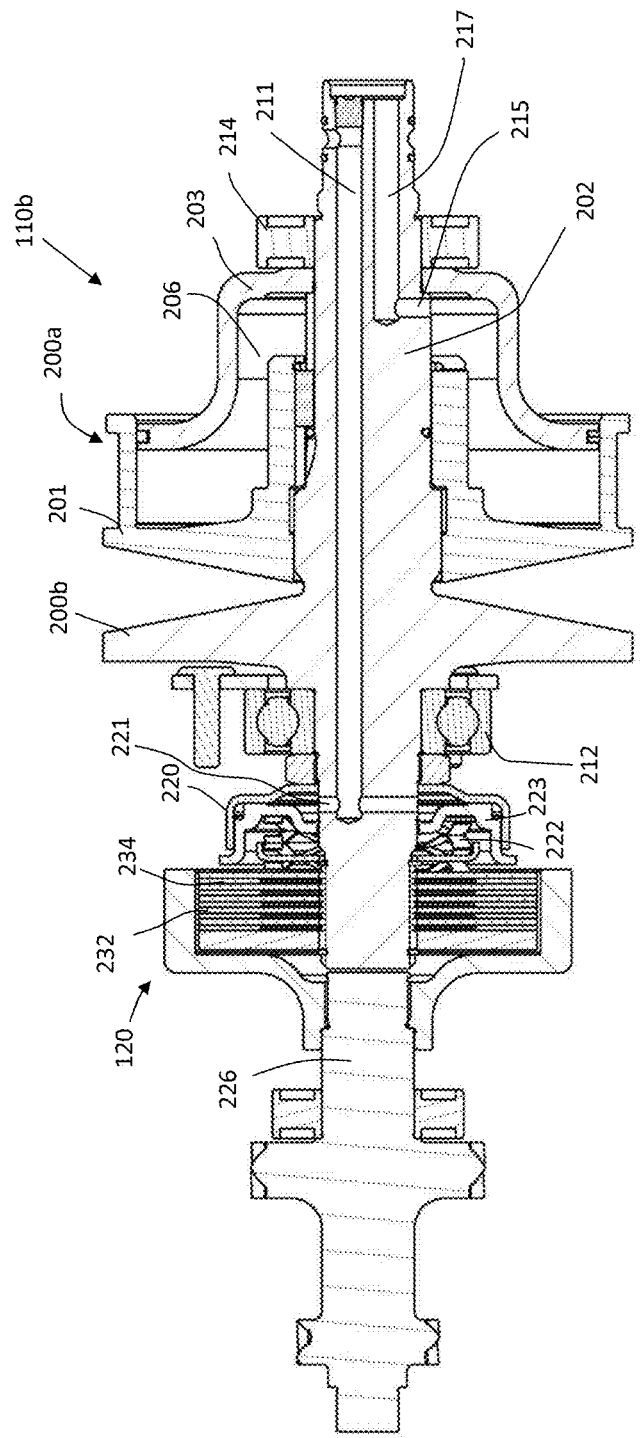
FIG. 3 is a cross-sectional side view of a driven sheave and ATM clutch assembly of FIG. 2.
Figure 4:
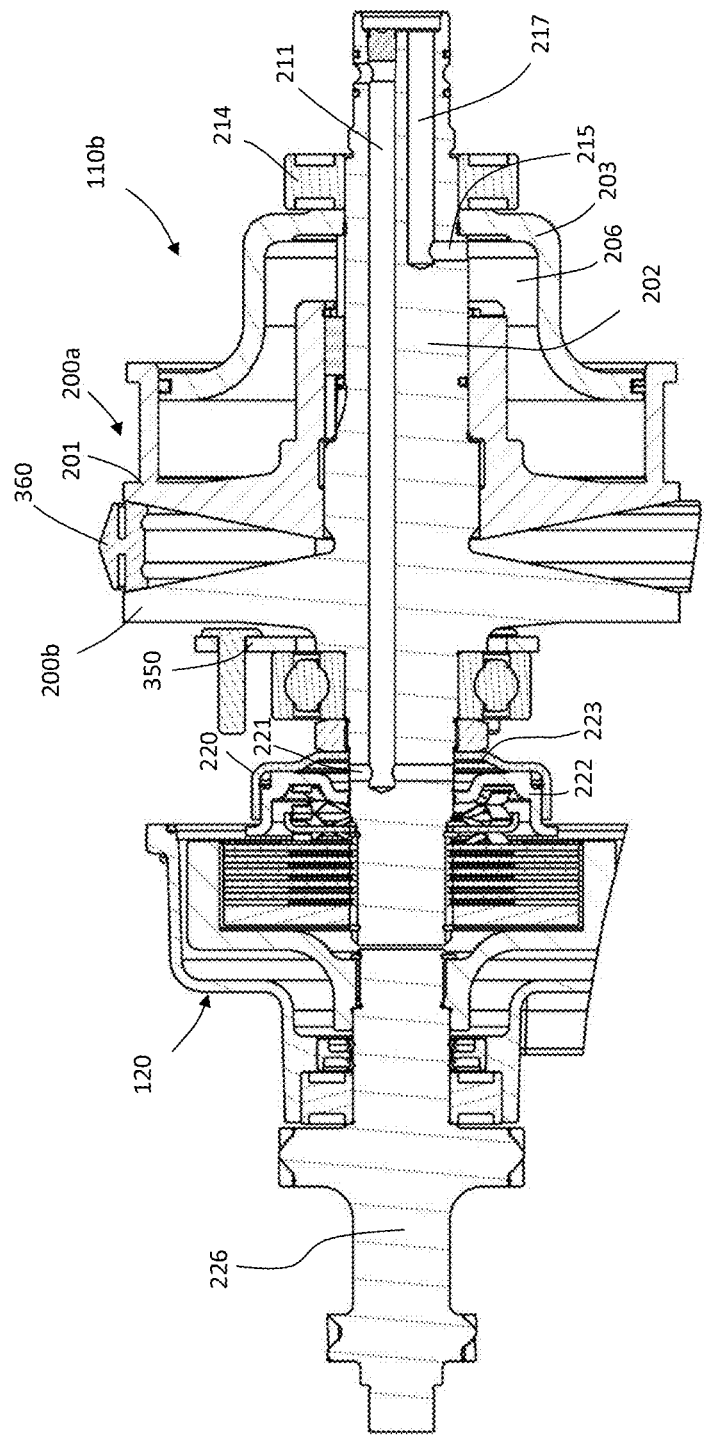
FIG. 4 is a cross-sectional side view of a driven sheave and ATM clutch assembly of FIG. 2 further illustrating a housing and belt according to an example aspect of the present invention.

FIGS. 2 through 5 illustrate one example of a driven sheave 110b and an ATM clutch 120. The driven sheave includes a movable sheave assembly 200a and a fixed sheave 200b. As best illustrated in the cross-sectional side view of FIGS. 3 and 4, the fixed sheave 200b is statically mounted on a post 202. The movable sheave assembly 200a in this example, includes a movable sheave 201 and a sheave stator 203. Moveable sheave 201 of the movable sheave assembly 200a is axially movable on the post 202. A movable sheave chamber 206 is formed by the moveable sheave 201 and the sheave stator 203. Sheave stator 203 is axially fixed on the post 202. Also illustrated are bearings 212 and 214 mounted on post 202. FIG. 4 illustrates a portion of a housing 350 where the driven sheave 110b and the ATM clutch 120 are mounted and belt 360 (endlessly looped member) that is engaged by the driven sheave 110b of the CVT 110.

Figure 5:
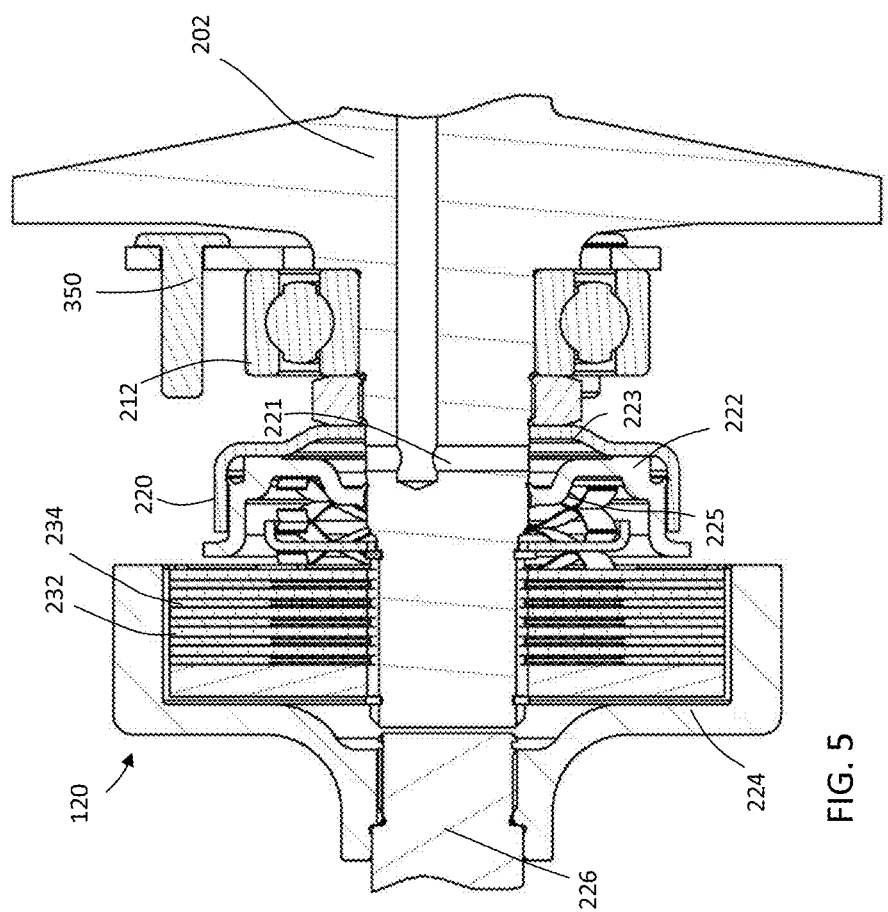
FIG. 5 is a close up partial cross-sectional side view of the driven sheave and ATM clutch assembly of FIG. 2.

As best illustrated in the close-up view of FIG. 5, the ATM clutch 120 includes a hydraulic clutch cylinder 220 that is statically fixed on the post 202 and a clutch piston 222. The clutch cylinder 220 and the clutch piston 222 form a clutch actuation chamber 223. Within a clutch basket 224 is received a clutch pack including alternating first set of clutch reaction plates 232 and second set of clutch friction plates 234. The first set of clutch plates 232 are coupled to the clutch basket 224 and the second set of clutch plates 234 are coupled to the post 202. The clutch basket 224 is coupled to a clutch output shaft 226.

In this example, the movable sheave 201 and the clutch 120 are actuated with separate hydraulic pressure. As best shown in FIGS. 3 and 4, post 202 includes a first central hydraulic passage 211 in which hydraulic fluid can flow to the clutch actuation chamber 223 through passage 221 to selectively move clutch piston 222. The clutch piston 222 selectively applies a thrust load the clutch plates 232 and 234 based on the pressure in the clutch activation chamber 223. The thrust load creates a friction force between clutch plates 232 and 234 to selectively transfer torque between the first set of clutch plates 232 and the second set of clutch plates 234. This selectively couples torque between the post 202 and the clutch output shaft 226 (which is coupled to the downstream driveline). As best illustrated in FIG. 5, this embodiment further includes a bias member 225 that is positioned to exert a force on the clutch piston 222 away from the clutch pack into the clutch actuation chamber 223 to disengage clutch piston 222 from clutch plates 232 and 234 when the hydraulic pressure in the clutch actuation chamber 223 is not above a select threshold.

As best illustrated in FIGS. 3 and 4, a second central passage 217 provides a hydraulic fluid path to passage 215 that leads to the movable sheave chamber 206. Pressure in the movable sheave chamber selectively moves the movable sheave 201 in relation to the fixed sheave 200b. As discussed above, this embodiment includes the first central passage 211 and a second central passage 217 so the ATM clutch 120 can be controlled separately from the movable sheave 201.

Figure 6:
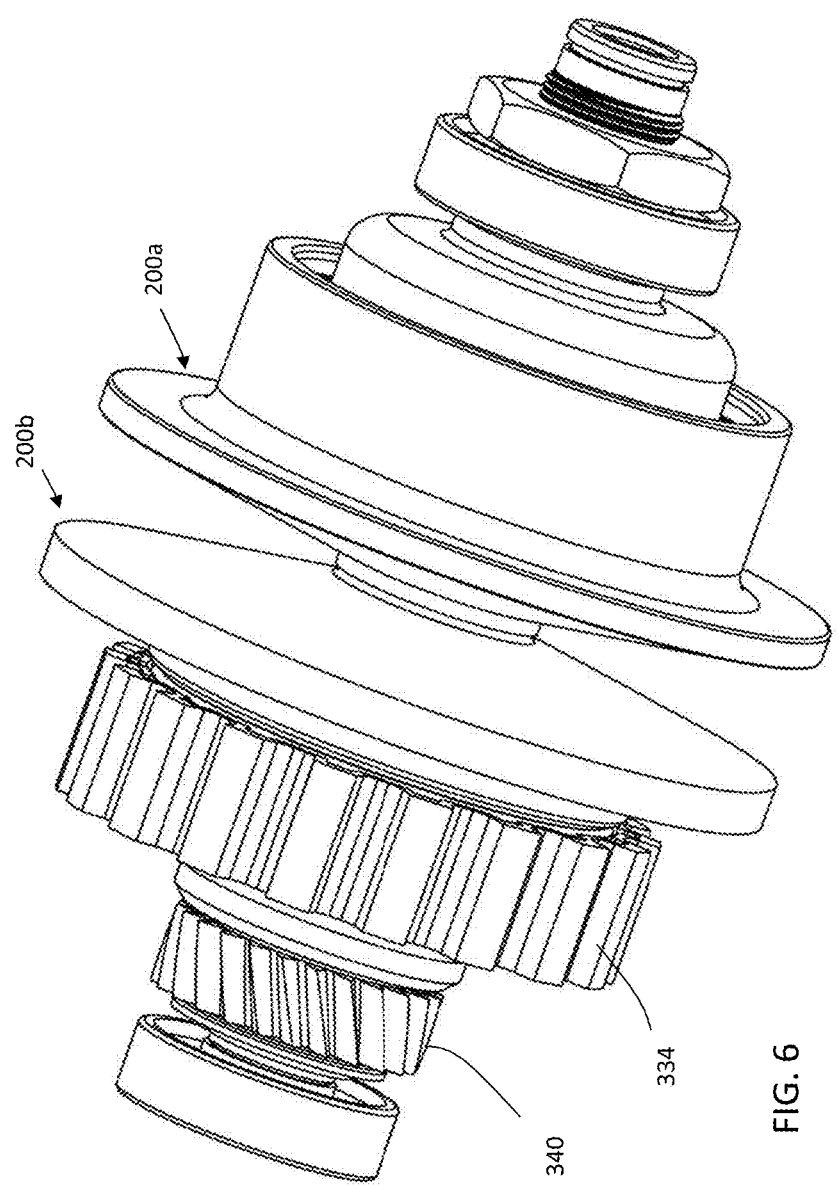
FIG. 6 is a side perspective view of another driven sheave and ATM clutch assembly according to an example aspect of the present invention.
Figure 7:
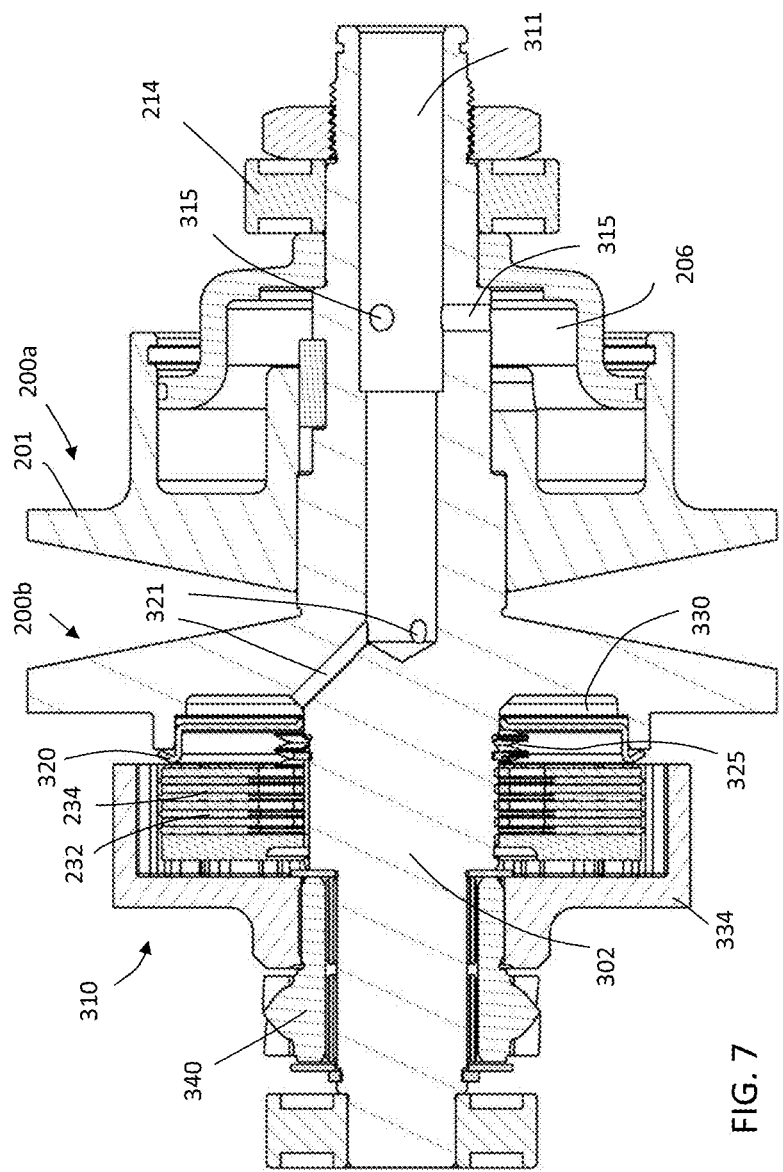
FIG. 7 is a cross-sectional side view of a driven sheave and ATM clutch assembly of FIG. 6.
Figure 8:
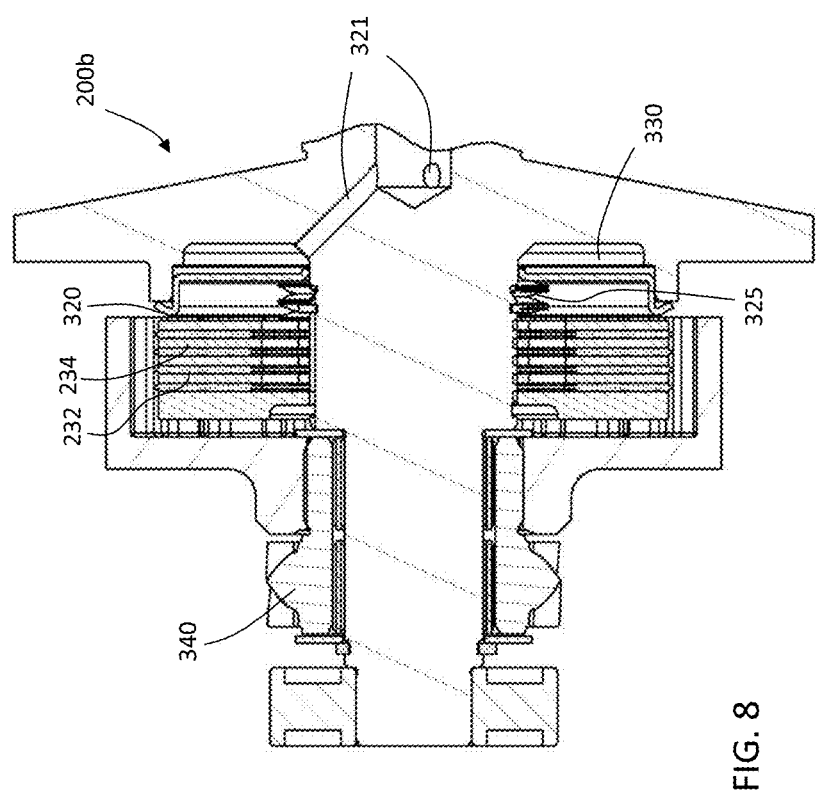
FIG. 8 is a close up partial cross-sectional side view of the driven sheave and ATM clutch assembly of FIG. 6.

Another example of a driven sheave 110b and a different ATM clutch 310 is illustrated in FIGS. 6, 7 and 8. In this example, both the driven sheave 110b and the ATM clutch are mounted on a single post 302 as best illustrated in FIG. 7. A clutch output gear 340 coupled to a clutch basket 334 provides a coupling link to the gearbox 130 of the driveline in this example.

Further in this example, the clutch actuation chamber 330 is formed by the fixed sheave 200b and the clutch piston 320. The clutch actuation chamber 330 is in fluid communication with a central hydraulic passage 311 through passages 321 in this example. Select hydraulic pressure in the clutch actuation chamber 330 causes the clutch piston 320 to engage the clutch pack formed from the first set of clutch plates 232 and the second set of clutch plates 234 to selectively couple torque between the post 302 and the clutch output gear 340. This embodiment further includes a bias member 325, best illustrated in FIG. 8, positioned to exert a force on the clutch piston 320 away from the clutch pack into the clutch actuation chamber 330 when the hydraulic pressure in the clutch actuation chamber 330 is not above a select threshold.

A hydraulic fluid path though passages 315 from the central passage 311 leads to the movable sheave chamber 206. Pressure in the movable sheave chamber 206 selectively moves the movable sheave 201 in relation to the fixed sheave 200b. As illustrated, in this example, the central passage is used to provide hydraulic pressure to both the movable sheave chamber 206 and clutch activation chamber 330 so that the ATM clutch 120 is controlled with the movable sheave 201.

Figure 9:
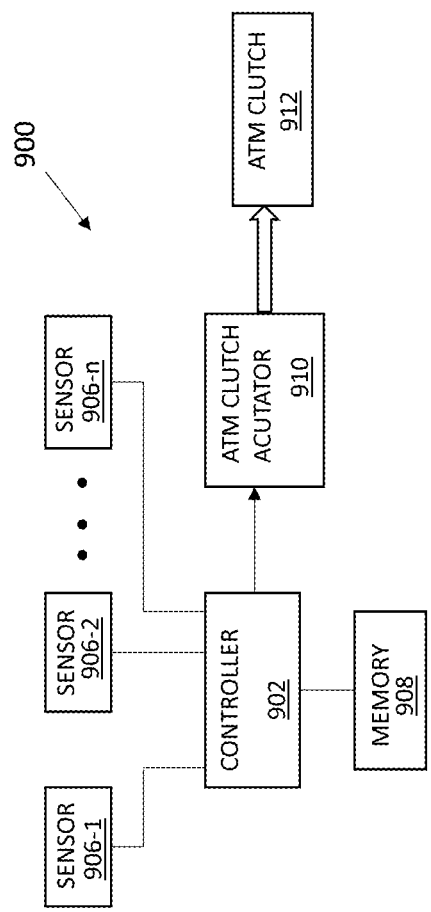
FIG. 9 illustrates a block diagram of an ATM clutch management system according to an example aspect of the present invention.

The ATM clutch in an example is used to reduce peak inertial loading for re-synchronization events as discussed in detail below. FIG. 9 illustrates a block diagram of an ATM clutch management system 900 in one example. The ATM clutch management system includes a controller 902 and a memory 908 in this example. The memory 908 at least stores operating instructions implemented by the controller 902.

In general, the controller 902 may include any one or more of a processor, microprocessor, a digital signal processor (DSP), an application specific integrated circuit (ASIC), a field programmable gate array (FPGA), or equivalent discrete or integrated logic circuitry. In some example embodiments, controller 902 may include multiple components, such as any combination of one or more microprocessors, one or more controllers, one or more DSPs, one or more ASICs, one or more FPGAs, as well as other discrete or integrated logic circuitry. The functions attributed to controller 902 herein may be embodied as software, firmware, hardware or any combination thereof. The controller 902 may be part of a system controller or a component controller such as, but not limited to a transmission control unit (TCU) or engine control unit (ECU). Memory 908 may include computer-readable operating instructions that, when executed by controller 902 provides functions of the ATM clutch management system 900. Such functions may include the functions to reduce peak inertial loading for re-synchronization events. The computer readable instructions may be encoded within memory 908. Memory 908 is an appropriate non-transitory storage medium or media including any volatile, nonvolatile, magnetic, optical, or electrical media, such as, but not limited to, a random-access memory (RAM), read-only memory (ROM), non-volatile RAM (NVRAM), electrically-erasable programmable ROM (EEPROM), flash memory, or any other storage medium.

Controller 902 in this example, receives sensor information from at least one sensor 906-1 through 906-n. Each sensor 906-1 through 906-n can be generally referenced as sensor 906. The sensors 906 may include one or more of a vehicle speed sensors, rpms or engine speed sensor, produced engine torque sensor, wheel speed sensor, throttle position sensor, brake pedal position sensor, CVT ratio sensors, IMU, gyroscope, accelerometer, pressure sensor, a mass flow sensor, a fuel flow sensor, etc. that provide sensors information, such as, but not limited to, vehicle speed, rpms or engine speed, produced engine torque, wheel speed, throttle position, brake pedal position, CVT ratio, pressure or force, acceleration, angular velocity, angular rate, mass flow rate, fuel flow rate, etc., to the controller 902. Controller 902, based on the sensor information, controls the ATM clutch 912 via ATM clutch actuator 910. In one example, the controller 902 monitors the motive torque 166 that is used in the torque calculation. As discussed above, the motive torque 166 is the engine torque times the instantaneous gear ratio to the driven sheave 110b of the CVT 110.

The ATM clutch actuator 910 may include a hydraulic system that provides select hydraulic pressure in the clutch actuation chamber to move the clutch piston 222. Other types of actuators may be used including, but not limited to, an electrically controlled actuator.

Figure 10:
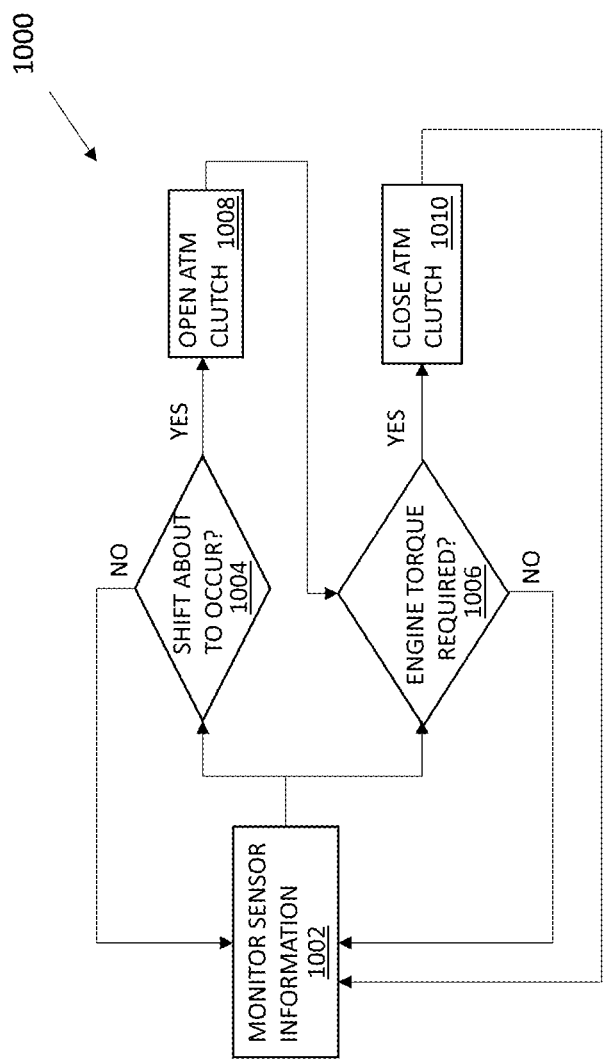
FIG. 10 illustrates an ATM clutch flow diagram according to an example aspect of the present invention.

An ATM clutch flow diagram 1000 of an example, is illustrated in FIG. 10. The ATM clutch flow diagram 1000 includes a series of sequential blocks. The sequence of the blocks may occur in a different order or in parallel in other examples. Hence, the invention is not limited to the sequential sequence of blocks set out in FIG. 10.

At block 1002, sensor information from one or more sensors 906 is monitored by the controller 902. It is determined if a shift is about to occur at block 1004 based on received sensor information. If it is determined a shift is not going to occur a block 1004, the process continues at block 1002 monitoring for sensor information. In the case that the ATM is open with non-zero wheel speed, a further logic block may be employed to ensure that synchronization conditions exist prior to closing the ATM. Meeting these conditions ensures that the engine and/or variator sheaves will not exceed upper or lower rpm ratings. If synchronization conditions are not met, the variator ratio may be changed to meet the synchronization conditions, or sensors 1002 may be monitored until the conditions exist.

If it is determined at block 1004 that a shift is about to occur, the ATM clutch 120 or 310 is opened at block 1008 to disconnect torque between the motor and driveline during a shift. The determination if a shift is about to occur may be based on one or more of wheel speed thresholds, brake pedal input, IMU inputs or an input at a shift lever. In the input at a shift lever example, the input may include a button, lever or other type of pressure sensor 906 that detects force that the driver has applied to the shift lever. The opening of the ATM clutch occurs when hydraulic pressure in the actuation chamber 223 or 330 is lowered below a present threshold. At the present threshold, the biasing member 225 or 325 (spring force) overcomes the hydraulic force and pushes the clutch piston back into the actuation chamber 223 or 330, thus removing the clamp force on the clutch plates of the clutch pack. It is determined at block 1006 if engine torque is required to the driveline. The determination of whether engine torque is required or needed by the driveline is based on sensor information from the sensors 906, which may include a sensor that monitors driver input at the accelerator pedal. If the engine torque is not currently needed at the driveline, the process continues monitoring for sensor information at block 1008.

If it is determined at block 1006 that engine torque is needed at the driveline, the ATM clutch 120 or 310 is closed at block 1010. Closing the clutch entails increasing hydraulic pressure in the actuation chamber 223 or 330 to the point where the hydraulic force on the piston overcomes the force from the biasing member 225 or 325 therein applying clamp load on the clutch plates of the clutch pack. In an example, the ATM clutch 120 or 310 is closed to synchronize the CVT 110 (variator) with ground while the launch clutch 108 is open, thus interrupting the torque path between the engine 102 and ground. After the ATM clutch 120 or 310 is closed, the vehicle 100 would be launched at the launch clutch 108. This allows torque to be communicated between the engine and the driveline. The process then continues at block 1002 monitoring for further sensor information to determine if a shift is about to occur.

EXAMPLE EMBODIMENTS

Example 1 includes an active torque management clutch system that includes an ATM clutch, a clutch actuator, and a controller. The ATM clutch is positioned between a driven sheave of a CVT and an axle. The clutch actuator is used to control the ATM clutch. The controller is in communication with at least one vehicle sensor and the clutch actuator. The controller is configured to open the ATM clutch when sensor information indicates a shift is about to occur and close the ATM clutch when the sensor information indicates engine torque is required in a driveline.

Example 2 includes the active torque management clutch system of Example 1, wherein the ATM clutch is positioned between the driven sheave of the CVT and a gear box of the driveline.

Example 3 includes the active torque management clutch system of any of the Examples 1-2, wherein the clutch actuator is part of a hydraulic actuator system.

Example 4 includes the active torque management clutch system of any of the Examples 1-3, wherein the ATM clutch further includes a post, a fixed sheave, a clutch basket, a clutch pack, and a clutch piston. The fixed sheave of the driven sheave is mounted on the post. The clutch basket is in operational communication with the driveline. The clutch pack includes a first set of clutch plates and a second set of clutch plates. The first set of clutch plates are coupled to the post and the second set of clutch plates are coupled to the clutch basket. The clutch actuator is configured to cause the clutch piston to engage the clutch pack to close the ATM clutch.

Example 5 includes the active torque management clutch system of Example 4, further wherein the post includes a central hydraulic passage to receive hydraulic fluid from a hydraulic system. The post further includes at least one clutch passage that extends from the central hydraulic passage into a clutch actuation chamber. Movement of the clutch is based at least in part on hydraulic pressure in the clutch actuation chamber caused by the hydraulic system.

Example 6 includes the active torque management clutch system of any of the Examples 1-5 wherein the controller is further configured to close the ATM clutch when it is determined that an engine torque is required by an operator.

Example 7 includes the active torque management clutch system of any of the Examples 1-6, wherein the controller is configured to dynamically maintain a slip torque of the ATM clutch at above an engine torque times a gear ratio to the ATM clutch.

Example 8 includes the active torque management clutch system of any of the Examples 1-7, wherein the controller is configured to set a slip torque of the ATM clutch lower than a slip torque of the CVT to prevent torque spikes from being transmitted to the CVT that cause belt slip.

Example 9 includes the active torque management clutch system of any of the Examples 1-9, wherein the controller is configured to open the ATM clutch to provide at least one of a disconnect for towing, and a disconnect following a wheel lock up event to allow the CVT to spin independently of the wheels to enable a down shift.

Example 10 includes the active torque management clutch system of any of the Examples 1-9, wherein opening the ATM clutch prevents drag torque from the CVT from crossing over to shift dogs.

Example 11 includes a method of operating a vehicle with an active torque management clutch system, the method including, generating sensor information with at least one sensor; determining if a shift is about to occur based on the sensor information; opening an active torque management (ATM) clutch that is positioned between a driven sheave of a continuously variable transmission (CVT) and a driveline when it is determined that the shift is about to occur; and closing the ATM clutch when is determined that engine torque is required by the driveline.

Example 12 includes the method of Example 11, wherein the sensor information is at least one of speed information, produced engine torque information, rpm information, throttle position information, accelerator pedal position, brake pedal position, and CVT ratio.

Example 13 includes the method of any of the Examples 11-12, wherein the ATM clutch is positioned between the driven sheave of the CVT and a gear box of the driveline.

Example 14 includes the method of any of the Examples 11-13, further including at least one of: opening the ATM clutch during wheel lockup to allow the CVT to down shift; and opening the ATM clutch to allow towing.

Example 15 includes a vehicle. The vehicle includes a motor, a CVT, a launch clutch, a driveline, and ATM clutch, at least one sensor, and a controller. The motor provides engine torque. The CVT includes a drive sheave and a driven sheave. The motor is in operational communication with the drive sheave of the CVT. The launch clutch is positioned between the motor and the drive sheave of the CVT. The driveline includes a gearbox that is shifted with shift dogs. The ATM clutch is positioned between the gearbox of the driveline and the driven sheave. The clutch actuator is used to control the ATM clutch. The controller is in communication with the at least one vehicle sensor and the clutch actuator. The controller is configured to open the ATM clutch when sensor information indicates a shift is about to occur to prevent drag torque from the CVT from crossing over to shift dogs during a shift and close the ATM clutch when the sensor information indicates that engine torque is required in the driveline.

Example 16 includes the vehicle of Example 15 wherein the gearbox includes at least two of: a high gear set; a reverse gear set; a low gear set; and a park gear set.

Example 17 includes the vehicle of any of the Examples 15-16, wherein the controller is further configured to open up the ATM clutch while closing the launch clutch during a wheel lockup event to allow the CVT to spin with the engine and downshift at one of a predetermined rate and a selected rate based at least in part on a sensor output in anticipation of a lower vehicle speed following the lockup event.

Example 18 includes the vehicle of any of the Examples 15-17, wherein the controller is configured to dynamically maintain a slip torque of the ATM clutch at above an engine torque times a gear ratio to the ATM clutch.

Example 19 includes the vehicle of any of the Examples 15-18, wherein the controller is configured to set slip torque of the ATM clutch lower than a slip torque of the CVT to prevent torque spikes from being transmitted to the CVT that cause belt slip.

Example 20 includes the vehicle of any of the Examples 15-19, wherein in the at least one sensor is one of a vehicle speed sensor, an rpm sensor, an engine speed sensor, a mass flow sensor, a fuel flow sensor, a produced engine torque sensor, a throttle position sensor, accelerator pedal position sensor, a brake pedal position sensor and a CVT ratio sensor.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. An active torque management clutch system comprising:
   an active torque management (ATM) clutch positioned between a driven sheave of a continuously variable transmission (CVT) and an axle;
   a clutch actuator to control the ATM clutch; and
   a controller in communication with at least one vehicle sensor and the clutch actuator, the controller configured to open the ATM clutch when sensor information indicates a shift is about to occur downstream of the ATM clutch and close the ATM clutch when the sensor information indicates engine torque is required in a driveline, the controller further configured to dynamically maintain a slip torque of the ATM clutch at above an engine torque times a gear ratio to the ATM clutch.

2. The active torque management clutch system of claim 1, wherein the ATM clutch is positioned between the driven sheave of the CVT and a gearbox of the driveline.

3. The active torque management clutch system of claim 1, wherein the clutch actuator is part of a hydraulic actuator system.

4. The active torque management clutch system of claim 1, wherein the ATM clutch further comprises:
   a post;
   a fixed sheave of the driven sheave mounted on the post;
   a clutch basket in operational communication with the driveline;
   a clutch pack including a first set of clutch plates and a second set of clutch plates, the first set of clutch plates coupled to the post and the second set of clutch plates coupled to the clutch basket; and
   a clutch piston, the clutch actuator configured to cause the clutch piston to engage the clutch pack to close the ATM clutch.

5. The active torque management clutch system of claim 4, further wherein:
   the post includes a central hydraulic passage to receive hydraulic fluid from a hydraulic system, the post further including at least one clutch passage that extends from the central hydraulic passage into a clutch actuation chamber, movement of the clutch is based at least in part on hydraulic pressure in the clutch actuation chamber caused by the hydraulic system.

6. The active torque management clutch system of claim 1, wherein the controller is further configured to close the ATM clutch when it is determined that an engine torque is required by an operator.

7. The active torque management clutch system of claim 1, wherein opening the ATM clutch prevents drag torque from the CVT from crossing over to shift dogs.

8. An active torque management clutch system comprising:
   an active torque management (ATM) clutch positioned between a driven sheave of a continuously variable transmission (CVT) and an axle;
   a clutch actuator to control the ATM clutch; and
   a controller in communication with at least one vehicle sensor and the clutch actuator, the controller configured to open the ATM clutch when sensor information indicates a shift is about to occur downstream of the ATM clutch and close the ATM clutch when the sensor information indicates engine torque is required in a driveline, the controller further configured to set a slip torque of the ATM clutch lower than a slip torque of the CVT to prevent torque spikes from being transmitted to the CVT that cause belt slip.

9. An active torque management clutch system comprising:
   an active torque management (ATM) clutch positioned between a driven sheave of a continuously variable transmission (CVT) and an axle;
   a clutch actuator to control the ATM clutch; and
   a controller in communication with at least one vehicle sensor and the clutch actuator, the controller configured to open the ATM clutch when sensor information indicates a shift is about to occur downstream of the ATM clutch and close the ATM clutch when the sensor information indicates engine torque is required in a driveline, the controller further configured to open the ATM clutch to provide at least one of a disconnect for towing, and a disconnect following a wheel lock up event to allow the CVT to spin independently of the wheels to enable a down shift.

10. A method of operating a vehicle with an active torque management clutch system, the method comprising:
    generating sensor information with at least one sensor;
    determining if a shift is about to occur downstream of an active torque management (ATM) clutch based on the sensor information;
    opening the ATM clutch that is positioned between a driven sheave of a continuously variable transmission (CVT) and a driveline when it is determined that the shift is about to occur;
    dynamically maintaining a slip torque of the ATM clutch at above an engine torque times a gear ratio to the ATM clutch; and
    closing the ATM clutch when is determined that engine torque is required by the driveline.

11. The method of claim 10, wherein the sensor information is at least one of speed information, produced engine torque information, rpm information, throttle position information, accelerator pedal position, brake pedal position, and CVT ratio.

12. The method of claim 10, wherein the ATM clutch is positioned between the driven sheave of the CVT and a gearbox of the driveline.

13. The method of claim 10, further comprising at least one of:
- opening the ATM clutch during wheel lockup to allow the CVT to down shift; and
- opening the ATM clutch to allow towing.

14. A vehicle comprising:
- a motor to provide engine torque;
- a continuously variable transmission (CVT) including a drive sheave and a driven sheave, the motor in operational communication with the drive sheave of the CVT;
- a launch clutch positioned between the motor and the drive sheave of the CVT;
- a driveline including a gearbox that is shifted with shift dogs;
- an active torque management (ATM) clutch positioned between the gearbox of the driveline and the driven sheave;
- a clutch actuator to control the ATM clutch;
- at least one sensor; and
- a controller in communication with the at least one vehicle sensor and the clutch actuator, the controller configured to open the ATM clutch when sensor information indicates a shift is about to occur to prevent drag torque from the CVT from crossing over to shift dogs during a shift and close the ATM clutch when the sensor information indicates that engine torque is required in the driveline.

15. The vehicle of claim 14, wherein the gearbox comprises at least two of:
- a high gear set;
- a reverse gear set;
- a low gear set; and
- a park gear set.

16. The vehicle of claim 14, wherein the controller is further configured to open up the ATM clutch while closing the launch clutch during a wheel lockup event to allow the CVT to spin with the engine and downshift at one of a predetermined rate and a selected rate based at least in part on a sensor output in anticipation of a lower vehicle speed following the lockup event.

17. The vehicle of claim 14, wherein the controller is configured to dynamically maintain a slip torque of the ATM clutch at above an engine torque times a gear ratio to the ATM clutch.

18. The vehicle of claim 14, wherein the controller is configured to set slip torque of the ATM clutch lower than a slip torque of the CVT to prevent torque spikes from being transmitted to the CVT that cause belt slip.

19. The vehicle of claim 14, wherein in the at least one sensor is one of a vehicle speed sensor, an rpm sensor, an engine speed sensor, a mass flow sensor, a fuel flow sensor, a produced engine torque sensor, a throttle position sensor, accelerator pedal position sensor, a brake pedal position sensor and a CVT ratio sensor.

* * * * *